United States Patent
Wantling

(10) Patent No.: US 8,202,363 B2
(45) Date of Patent: Jun. 19, 2012

(54) MODIFIER FOR CONCRETE AND CEMENT FORMULATIONS AND METHODS OF PREPARING THE SAME

(75) Inventor: Steven J. Wantling, Hoover, AL (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 126 days.

(21) Appl. No.: 12/406,579

(22) Filed: Mar. 18, 2009

(65) Prior Publication Data

US 2009/0235844 A1    Sep. 24, 2009

Related U.S. Application Data

(60) Provisional application No. 61/037,761, filed on Mar. 19, 2008.

(51) Int. Cl.
*C04B 24/24* (2006.01)
(52) U.S. Cl. .......... 106/696; 106/724; 106/823
(58) Field of Classification Search .......... 106/724, 106/823, 696
See application file for complete search history.

(56) References Cited

U.S. PATENT DOCUMENTS

| | | |
|---|---|---|
| 1,814,292 A | 7/1931 | Chiltick |
| 1,920,627 A | 8/1933 | Brassert |
| 2,432,963 A | 12/1947 | Camp |
| 2,803,555 A | 8/1957 | Clark, Jr., et al. |
| 2,839,811 A | 6/1958 | Benedict et al. |
| 3,189,469 A | 6/1965 | Littler at al. |
| 3,202,522 A | 8/1965 | Yang et al. |
| 3,232,777 A | 2/1966 | Bush |
| 3,437,611 A | 4/1969 | Macklin |
| 3,563,786 A | 2/1971 | Tse et al. |
| 4,153,743 A | 5/1979 | Caramanian |
| 4,656,005 A | 4/1987 | Arpin |
| 4,748,196 A | 5/1988 | Kuroda et al. |
| 5,173,117 A | 12/1992 | Inokawa et al. |
| 5,188,765 A | 2/1993 | Ehrhardt |
| 5,584,958 A | 12/1996 | Gillis et al. |
| 6,010,596 A | 1/2000 | Song |
| 6,315,825 B1 | 11/2001 | Black |
| 6,585,820 B2 * | 7/2003 | Wantling et al. ............ 106/271 |
| 6,652,643 B1 | 11/2003 | Black |
| 6,663,707 B2 * | 12/2003 | Wantling et al. ............ 106/778 |
| 7,294,189 B2 | 11/2007 | Wantling |
| 7,374,610 B2 * | 5/2008 | Wantling ............ 106/271 |
| 7,473,712 B2 | 1/2009 | Wantling et al. |
| 7,473,713 B2 | 1/2009 | Wantling et al. |
| 7,563,826 B2 | 7/2009 | Wantling et al. |
| 7,696,253 B2 | 4/2010 | Wantling et al. |
| 7,807,735 B2 * | 10/2010 | Wantling ............ 524/45 |
| 2006/0100341 A1 | 5/2006 | Mosquet et al. |
| 2006/0243323 A1 | 11/2006 | Wantling et al. |
| 2006/0283356 A1 | 12/2006 | Donlon et al. |
| 2007/0181035 A1 | 8/2007 | Wantling et al. |
| 2009/0235845 A1 * | 9/2009 | Wantling ............ 106/660 |
| 2009/0297818 A1 | 12/2009 | Williams et al. |

FOREIGN PATENT DOCUMENTS

| | | |
|---|---|---|
| JP | 2005/344433 | 6/2004 |
| SU | 1678643 A1 | 9/1991 |
| WO | WO 01/40134 A1 | 6/2001 |
| WO | wo 2005/039841 | 5/2005 |

OTHER PUBLICATIONS

I.L. Knunyants (editor), the Chemical Encyclopedia, 1998, pp. 425-426, vol. 1, The Great Russian Encyclopedia, Moscow, Russia.

* cited by examiner

*Primary Examiner* — Paul Marcantoni

(57) ABSTRACT

Disclosed are wax emulsion modifiers for concrete and cement formulations and methods for preparing the same. The modifiers are applicable to roller compacted concrete (RCC), used for manufacturing of industrial floor slabs, dams and roads. This invention also relates to conventional Portland cement concrete mix designs or other applied concrete mixes for formed structural shapes and transport road mix designs, providing a more rapid dehydration of the aqueous phase, without sacrificing strength, yet providing a higher density that remains workable at the point of application. The modifier of the invention may be utilized for either the initial soil/cement base or for the final/finished placement.

6 Claims, No Drawings

US 8,202,363 B2

MODIFIER FOR CONCRETE AND CEMENT FORMULATIONS AND METHODS OF PREPARING THE SAME

RELATED APPLICATION DATA

This application claims the benefit of U.S. Provisional Application Ser. No. 61/037,761 filed Mar. 19, 2008, the entire contents of which are hereby incorporated by reference.

FIELD OF THE INVENTION

The present invention relates to wax emulsion modifiers for concrete and cement formulations and to methods for preparing the same. The modifiers are applicable to roller compacted concrete (RCC), used for manufacturing of industrial floor slabs, dams and roads. This invention also relates to conventional Portland cement concrete mix designs or other applied concrete mixes for formed structural shapes and transport road mix designs, providing a more rapid dehydration of the aqueous phase, without sacrificing strength, yet providing a higher density that remains workable at the point of application. The modifier of the invention may be utilized for either the initial soil/cement base or for the final/finished placement.

BACKGROUND OF THE INVENTION

Roller Compacted Concrete (RCC) is concrete, but it is placed by non-traditional methods which require a drier or stiffer consistency. RCC can have a much broader range of material properties than conventionally placed concrete, for example, it can use aggregates not meeting normal requirements, it can be placed at very high production rates, and it can be much less expensive.

By definition, RCC is concrete comprising a mixture of cement, sand, aggregate, such as gravel, stone, sand and the like, and water, having a consistency allowing it to be compacted with a heavy vibratory roller, for example, a ten-ton roller intended for asphalt and granular base. RCC is usually mixed in a continuous process, rather than in batches, delivered with trucks or conveyors, spread in layers using a bulldozer, and given final compaction with a vibratory roller.

RCC has generally been used for applications such as dam construction, pavement and bridge deck construction requiring a thick topping, usually two inches, as an essential element to achieve the required strength and fatigue life of the exterior slabs.

Conventional poured mass concrete is designed to have the highest fluidity by use of water and additives, the RCC formulation has the same ingredients as conventional concrete, i.e., cement, water, and aggregates, but unlike conventional concrete it is a drier mix stiff enough to be compacted by vibratory rollers. The pressure applied during the compaction phase of the mix implies a need of the highest possible initial density to ensure superior compressive strength, this can be reached by reducing the water level, however if the level is below the hydration level, the cured concrete will not reach the optimum properties. Therefore, current RCC mixes still have a water content that is at best a compromise between the full cure and the lowest slump of the concrete during the application of the vibratory rollers. There is a need in the industry for an RCC formulation that has the right amount of water to achieve a correct amount of hydration and also has the highest initial compressive strength.

Surfactants decrease the need for excess water, while making the concrete mix pourable, as if excess water was present. When surfactants are introduced into the concrete, the result is a less porous and somewhat stronger product. The strength increase is attributed to lower water/cement ratio and decrease in porosity. While surfactants improve the resistance to water penetration, surfactants alone provide too little improvement to be considered a solution to the problem.

Attempts have been made to increase the early strength of cement aggregate products, particularly concrete blocks, concrete masonry units, and the like, by adding an accelerator, such as calcium chloride triethanolamine or sodium silicate, to the mix or subjecting the product to steam or using type III cement. However, the addition of these accelerators, or the use of steam, increases the cost of producing the product and often its production time.

Another attempt provides for compositions, and a process for improving the early strength of cement aggregate products, in a stabilized aqueous emulsion with a surfactant such as alkali metal salts of fatty acids, alkali metal salts of sulfated fatty acids, alkali metal alkyl sulfates, alkali metal alkyl sufonates, alkali metal aryl sufonates, alkali metal alkyl lauryl sulfonate, alkali metal salts of alkylated naphthalene, alkali metal salts of lignosulfonic acid, condensation products of ethylene oxide and polyalkylene glycols, fatty acid glycerides, fatty acid amides, polyethylene sorbitol esters of fatty acids, quaternary ammonium halides, sorbitan esters, sulfonated or sulfated fatty acid esters or amides, and sulfonic acid. Results were achieved with sodium lignosulfonate as the surfactant, particularly with slack wax as the waxy substance in the emulsion.

The prior art indicates that the introduction of a wax in a solvent into the composition of water, cement, and aggregate used to produce a concrete product caused the resulting concrete to have substantially less strength than the concrete product produced from a substantially identical composition without the wax. It is believed that the wax coated the aggregate particles and inhibited the adherence of the cement paste to the aggregate causing the weakening as measured by testing the compressive strength. Therefore, the use of waxes in cement formulations for RCC application was not previously advisable.

SUMMARY OF THE INVENTION

In one embodiment, the present invention provides an aqueous emulsion, useful for providing a cementitious composition with an initial compressive strength of at least 2400 psi, which includes a paraffin hydrocarbon wax, a saponifiable wax, a saponifier, and an optional dispersant.

In another embodiment, the present invention provides an aqueous emulsion, useful for providing a cementitious composition with an initial compressive strength of at least 2400 psi, which includes essentially only a paraffin hydrocarbon wax, a saponifiable wax, a saponifier, a dispersant and water.

In another embodiment, the present invention provides a method for preparing an aqueous emulsion, that provides cementitious compositions with an initial compressive strength of at least 2400 psi, which includes the steps of combining water, a paraffin hydrocarbon wax, a saponifiable wax and a saponifier, heating the combination to a temperature of between about 185° F. (85° C.) to about 205° F. (96.1° C.), then homogenizing the mixture.

In another embodiment, the present invention provides for a cementitious composition, including dry cement, admixed with about 1 to about 25 gallons per cubic yard of an aqueous emulsion which includes a paraffin hydrocarbon wax, a saponifiable wax, a saponifier, and an optional dispersant.

DETAILED DESCRIPTION OF THE INVENTION

It has been found that the aqueous emulsion modifiers of the invention, which include a paraffin wax, a saponifiable wax, a saponifier, and optionally a dispersing agent, when admixed into concrete design mixes, provides for improved properties and advantages.

In one embodiment the paraffin hydrocarbon wax has a melting point in the range of about 50° C. to about 70° C. In another embodiment the paraffin wax contains one or more $C_nH_{2n+2}$ hydrocarbons, where n is an integer between 18 and 42. The paraffin wax may comprise about 20 to about 60 wt % of the emulsion. In another embodiment, the paraffin wax may comprise about 30 to about 50 wt % of the emulsion.

In one embodiment, the second wax is a Montan wax, also known as lignite wax, having a melting point in the range of 70° C. to 100° C. and an acid value greater than 25, and a saponification number greater than 85. The second wax may also be from a class of waxes characterized in that it has both an acid value and a saponification value, for example, carnauba wax, candelilla wax, bayberry-myrtle wax, Japan wax, and the like. The second wax may also be a combination or any subset of such saponifiable waxes. In one embodiment, the second wax is present in the emulsion is between about 0.01 to about 20 parts, by weight, per 100 parts of the paraffin wax. The parts by weight of the second wax correspond to the second wax comprising between about 0.002 wt % to about 12 wt % of the emulsion. In another embodiment, the second wax is present in an amount of between about 0.01 to about 10 parts, by weight, per 100 parts of the paraffin wax, corresponding to between about 0.002 wt % to about 6 wt % of the emulsion. In another embodiment, the second wax is present in an amount of between about 0.5 to about 7 parts, by weight, per 100 parts of the paraffin wax, corresponding to between about 0.1 wt % to about 4.2 wt % of the emulsion. In another embodiment, the second wax is present in an amount of between about 0.02 to about 5 parts, by weight, per 100 parts of the paraffin wax, corresponding to between about 0.004 wt % to about 3 wt % of the emulsion.

Saponification of such waxes, as is known in the art, may be accomplished by combining the wax with a strongly basic material such as an ammonia hydroxide or an alkali metal hydroxide such as potassium hydroxide, sodium hydroxide or lithium hydroxide. The amount of saponifier needed may be calculated based on the saponification value of the wax. For one example, the saponification value divided by 1000 equals the grams of potassium hydroxide to add per gram of wax. For Montan wax, at least 0.1 part, corresponding to at least 0.0002 wt % (or at least 1.2 wt %) of the emulsion, potassium hydroxide, by weight, or less than 1 part by weight, corresponding to less than 12 wt % (or less than 0.002 wt %) of the emulsion, sodium hydroxide, or more than 0.1 part by weight, corresponding to more than 0.0002 wt % (or more than 1.2 wt %) of the emulsion, ammonium hydroxide is required per part of Montan wax. The actual amount of the alkali metal or ammonium hydroxide required can be readily determined by those skilled in the art.

In certain embodiments of the present invention a dispersing aid, or fluidity modifier, may be useful. Such dispersing agents are strong lipophiles, which are, consequently, good defoamers. One such dispersing agent is poly(oxy-1,2-ethanedyl), alpha-phenyl-omega-hydroxy styrenate. A salt of polynaphthalenesulfonic acid may also be utilized as a dispersant/surfactant. The salt may be produced by the reaction of polynaphthalenesulfonic acid and a saponifier. One commercially available polynaphthalenesulfonic acid is DISAL GPS, which may be obtained from Handy Chemical, Montreal, Quebec, Canada. DURASAR Polynaphthalene sulfonate calcium salts, also available from Handy Chemical, Montreal, Quebec, Canada, may also be used as dispersing agent. In one embodiment, the dispersant/surfactant may comprise about 0.1 to about 5 wt % of the emulsion. In another embodiment the dispersant/surfactant may comprise about 0.25 to about 5 wt % of the emulsion.

In one embodiment, the ratio between the dry blend cement and the emulsion of the invention is between about 1 to about 25 gallons per cubic yard of mix (about 3.8 to about 94.6 liters per cubic meters of mix). In another embodiment, the ratio between the dry blend cement and the emulsion of the invention is between about 1 to about 7 gallons per cubic yard of mix (about 3.8 to about 26.6 liters per cubic meters of mix). When blended with cement, aggregates and sand, the emulsion of the invention provides an initial compressive strength of at least 2400 psi which increases further with curing to the design strength, which is typically at least about 5000 psi.

In one embodiment, the wax emulsion modifier of the invention is admixed with a cementitious composition, typically Portland cement and class C fly ash. In another embodiment, the wax emulsion modifier of the invention is not applied to the surface of a cementitious composition.

In one embodiment, in cement based systems, the wax emulsion modifier of the invention, when admixed in to concrete designs, is believed to provide lubricity allowing for greater compaction which results in higher density with equivalent compactive forces. The reduction in the water/cement ratio in cement designs results in greater strength of at least >40% at 7 days, reducing the optimum moisture content by at least >35% significantly increasing the density by decreasing air voids normally experienced with these mix systems. Benefits for such systems incorporating the wax emulsion modifier include higher compactive density or the same density with less compactive effort, lower water demands for compaction, lower cement requirements to obtain equivalent strength (>2%), and improved workability. Further advantages included lower transportation cost resulting from transporting less water and decreased permeability due to the reduction of interconnected air voids, which improved water resistance. Benefits additionally include aesthetical advantages such as in the surface appearance of RCC incorporating the wax emulsion modifiers of the invention.

In another embodiment, in final placement RCC mix designs the admixing of the wax emulsion modifier of the invention results in at least a >20% strength gain in 7 days and at least >10% in 28 days. Incorporating the wax emulsion modifer of the invention into such mixes allows for lower cement content to gain equivalent strengths allowing lower placement thicknesses to carry the same design loads.

EXAMPLES

Table 1 lists the formulation of the modifier utilized in the examples. In a typical preparation, the water and water soluble components were combined then heated to a temperature of between about 185° F. (85° C.) to about 205° F. (96.1° C.). The wax compounds were incorporated and also heated to a temperature of between about 185° F. (85° C.) to about 205° F. (96.1° C.). The aqueous and wax mixtures were then combined and the resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

TABLE 1

Modifier Formulation

| Component | Weight Percent (wt %) |
|---|---|
| Paraffin Wax | 38.68 |
| Montan Wax | 1.00 |
| DISAL[1] Dispersant | 1.00 |
| 45% aq. KOH | 0.25 |
| Water | 59.07 |

[1]DISAL is a polynaphthalenesulfonic acid dispersant available from Handy Chemical, Montreal, Quebec, Canada.

Table 2 sets forth a typical RCC mix design incorporating the wax emulsion modifier of the invention.

TABLE 2

RCC Mix Design for 1 Cubic Yard

| Material | Pounds (kg) |
|---|---|
| Type 1 Cement | 300 (136) |
| Class C Fly Ash | 125 (56.7) |
| Concrete Sand | 1263 (572.9) |
| Size 57 Uncrushed Gravel | 2195 (995.6) |
| Water | 109 (49.4) |
| Wax Emulsion Modifier of the Invention | 21.25 (9.64) |

Table 3 illustrates that the wax emulsion modifier of the invention provides higher density with equivalent compactive forces. The reduction in the water/cement ratio in soil/cement designs results in greater strength, >40% at 7 days, reducing the optimum moisture content by >35% significantly increasing the density by decreasing air voids normally experienced with these mix systems. (ALDOT 416-05 Soil-Cement).

When the emulsion of the invention is used, the quantity of water contained in the emulsion is deducted from the initial water quantity from the composition without emulsion. Mixing was continued until the mixture was uniform in consistency and hydration had occurred noted by a visual change in the consistency of the mix.

Table 4 sets forth the mix designs utilized in compressing strength evaluations, with the results set forth in Table 5.

TABLE 4

Compressive Strength Evaluation Test Mix Design

| PER 1 CUBIC YARD MIX DESIGN, POUNDS ASTM SLUMP/ STRENGTH EVALUATION | POUNDS CONTROL | POUND SWITH ADDITIVE |
|---|---|---|
| CEMENT | 300 | 285 |
| CLASS C FLY ASH | 125 | 119 |
| CONCRETE SAND | 1263 | 1263 |
| #57 GRAVEL NO MOISTURE ADJUST | 2195 | 2195 |
| WATER | 148.5 | 132.5 |
| Wax Emulsion Modifier of the Invention | | 21.25 |

TABLE 5

ASTM C 1176 Compressive Strength
ASTM C 1176
TEST CYLINDERS
6 × 12 INCHES ASTM C 31
AVERAGE OF TWO SAMPLES

| | CONTROL | WITH ADDITIVE |
|---|---|---|
| 7 DAY AGE | | |
| COMPRESSIVE STRENGTH, PSI | 1970 | 2405 |
| 28 DAY AGE | | |
| COMPRESSIVE STRENGTH, PSI | 3035 | 3475 |

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A cementitious composition comprising dry cement and an aqueous emulsion comprising:
(a) a paraffin hydrocarbon wax,
(b) a saponifiable wax,

TABLE 3

ALDOT 416-05 Soil-Cement Replacement

ASTM D 558 METHOD A

| | CONTROL | WITH ADDITIVE |
|---|---|---|
| MAXIMUM/CORRECTED DRY DENSITY (pcf) | 121.1 | 126.4 |
| OPTIMUM/CORRECTED MOISTURE CONTENT % | 11.4 | 8.4 |

ALDOT SOIL-CEMENT 416-05

| | AGE DAYS | LOAD POUNDS | CYL DIA INCHES | AREA INCH$^2$ | CORRECTION | STRENGTH PSI |
|---|---|---|---|---|---|---|
| CONTROL AVERAGE OF 3 Samples | 7 | NR | NR | NR | NR | 620 |
| WITH Wax Emulsion Modifier of the Invention AVERAGE OF 3 Samples | 7 | 12,150 | 3.99 | 12.51 | 0.91 | 880 |

(c) a saponifier, and
(d) an optional dispersant, wherein the emulsion is admixed with the composition and is present in an amount of about 1 to about 25 gallons per cubic yard of cement.

2. The cementitious composition of claim 1, wherein the composition is a roller compacted concrete.

3. The cementitious composition of claim 1, wherein the aqueous emulsion consists essentially of:
(a) a paraffin hydrocarbon wax,
(b) a saponifiable wax,
(c) a saponifier,
(d) a dispersant, and
(e) water.

4. The cementitious composition of claim 1, wherein the cementitious composition comprises an initial compressive strength of at least 2400 psi.

5. The cementitious composition of claim 1, wherein the dry cement comprises a mixture of Portland cement and class C fly ash.

6. The cementitious composition of claim 3, wherein the aqueous emulsion consists essentially of:
(a) about 38.68 wt % of Paraffin Wax,
(b) about 1 wt % on Montan Wax,
(c) about 1 wt % of polynapthalenesulfonic acid dispersant,
(d) about 0.25 wt % of 45% aqueous potassium hydroxide, and
(e) about 59.07 wt % water.

* * * * *